(12) United States Patent
Ikari

(10) Patent No.: US 6,179,082 B1
(45) Date of Patent: Jan. 30, 2001

(54) HYDRAULIC STEERING APPARATUS AND METHOD

(75) Inventor: Masanori Ikari, Sayama (JP)

(73) Assignee: Komatsu Ltd., Tokyo (JP)

( * ) Notice: Under 35 U.S.C. 154(b), the term of this patent shall be extended for 0 days.

(21) Appl. No.: 09/164,239

(22) Filed: Sep. 30, 1998

(30) Foreign Application Priority Data

Sep. 30, 1997 (JP) .................................................. 9-282653

(51) Int. Cl.$^7$ .................................................. B62D 5/08
(52) U.S. Cl. ........................... 180/418; 180/432; 180/441
(58) Field of Search .................................... 180/441, 417, 180/418, 423, 432, 442

(56) References Cited

U.S. PATENT DOCUMENTS 3,439,768 * 4/1969 Medley ................................. 180/418
5,732,789 * 3/1998 Stephenson ........................... 180/441
5,947,228 * 9/1999 Rolando ............................... 180/441

FOREIGN PATENT DOCUMENTS 63-291772  11/1988  (JP) .

\* cited by examiner

Primary Examiner—Anne Marie Boehler
(74) Attorney, Agent, or Firm—Sidley & Austin

(57) ABSTRACT

A hydraulic steering apparatus having a small angle of operation, can be minutely and smoothly controlled and requires a small number of operation times. The hydraulic steering apparatus is mounted onto an automatic traveling vehicle and has a pilot valve which is switched from a neutral position to a steering position upon receiving a target steering angle from a target steering angle input means. A main steering valve is switched from a neutral position to a steering position upon receiving pressurized oil from the pilot valve and outputs pressurized oil to multiple hydraulic actuators in order to produce an actual steering angle. An excitation current output means outputs an excitation current corresponding to a deviation angle between the target and actual steering angles to an electromagnetic variable pressure reducing valve.

9 Claims, 3 Drawing Sheets

NEUTRAL POSITION (Np)

LEFT AND RIGHT STEERING POSITIONS (Lp, Rp)

HYDRAULIC STEERING APPARATUS AND METHOD

FIELD OF THE INVENTION

The present invention relates to a hydraulic steering apparatus having a pilot valve and being mounted onto an automatic traveling vehicle or other types of hydraulic rotary mechanisms.

BACKGROUND OF THE INVENTION

There are various types of hydraulic steering apparatuses, which can be classified mainly into two types: a handle type and a joystick lever type.

(1) The handle type is well known and can be classified mainly into two types: a follow-up linkage type and a total hydraulic type. The handle type allows an operator to rotate a handle provided adjacent to a cab seat in order to obtain a steering angle proportional to a rotary operation angle of the handle. The maximum rotary operation angle is around two to three clockwise or counterclockwise rotations, for example.

In the follow-up linkage type, when the operator rotates the handle clockwise, a steering valve directly connected to the handle is switched from a neutral position to a right steering position. This allows pressurized oil from a hydraulic pump to flow into a hydraulic cylinder so as to operate the cylinder, via a steering valve. The hydraulic cylinder is attached to a body and tie rods at both ends, and therefore the vehicle starts a right steering operation when the hydraulic cylinder operates. Between the tie rod and the steering valve, there is supported a link mechanism (called a follow-up linkage) which attempts to return the steering valve to the neutral position when the vehicle is steered. Accordingly, if the operator stops the clockwise rotation of the handle, the steering valve returns from the right steering position to the neutral position, following the stop operation, to stop the pressurized oil supply to the hydraulic cylinder. In other words, the right steering operation is completed with a steering angle corresponding to a rotary operation angle. The left steering operation is the same as the right steering operation.

In the total hydraulic type, when the operator rotates the handle clockwise, a rotary steering valve (called an orbit roll steering valve) is switched from the neutral position to the right steering position. This allows pressurized oil from a first hydraulic pump to flow to the hydraulic cylinder, as to operate the cylinder, via the rotary steering valve and via a second hydraulic pump integrally mounted onto a rotary shaft of the rotary steering valve. The hydraulic cylinder is attached to a body at each end, and therefore the vehicle starts a right steering operation when the hydraulic cylinder is actuated. If the operator stops the clockwise rotation, the second hydraulic pump provided in the rotary steering valve automatically returns the rotary steering valve from the right steering position to the neutral position, which stops the pressurized oil supply to the hydraulic cylinder. The second hydraulic pump rotates by a rotary operation angle to supply pressurized oil of a flow rate based on the rotary operation angle to the hydraulic cylinder. Accordingly, the right steering operation is completed with a steering angle approximately equal to the rotary operation angle. The left steering operation is the same as the right steering operation.

(2) The joystick lever type is more often used in recent times. In this type, it is possible to obtain a steering speed approximately proportional to a tilt operation angle when the operator tilts a joystick lever provided adjacent to the cab seat. The maximum tilt operation angle is equal to a rotary angle of the operator's wrist tilting leftward or rightward (in other words, a minor operation angle control), and therefore it is impossible to expect a wide range of operation angles (in other words, a major operation angle control) such as two to three clockwise or counterclockwise rotations, as obtained in the handle type. Therefore, this type of the apparatus has a configuration as described below.

If the operator tilts the joystick lever rightward, the steering valve moves from the neutral position toward the right steering position by an amount approximately proportional to the tilt operation angle. In other words, openings of flow paths from the hydraulic pump to the hydraulic cylinder in the steering valve are increased or decreased in proportion to the tilt operation angle. This allows pressurized oil from the hydraulic pump to flow to the hydraulic cylinder via the steering valve by a flow rate per unit approximately proportional to the tilt operation angle, so as to actuate the hydraulic cylinder. The hydraulic cylinder is attached to a body at each end in the same manner as for the handle type. Accordingly, when the hydraulic cylinder is actuated, the vehicle starts a right steering operation. Subsequently, when the operator judges that an actual steering angle of the vehicle equals a target steering angle by visual observation or skill, or at a desired timing, he returns the joystick lever to a central position. By this operation, the steering valve returns from the right steering position to the neutral position to stop the pressurized oil supply to the hydraulic cylinder. In other words, the steering speed is approximately proportional to the tilt operation angle, and the right steering operation is completed by the return of the joystick lever to the central position by the operator. The left steering operation is the same as the right steering operation.

The prior art set forth above, however, has the following problems:

(1) In the handle type apparatus, when the operator stops the rotary operation, the steering valve automatically returns to the neutral position. Therefore, like the joystick lever type, the operator need not return the steering valve to the neutral position each time. In addition, the handle type has an advantage that smooth control is achieved at a minute steering angle since it is possible to obtain a steering angle corresponding to a rotary operation angle, in addition to a great steering angle per unit rotary operation angle. This advantage, however, means that a great rotary operation angle is required to obtain a great steering angle. Therefore, in a wheel loader which requires a frequent switching between a right steering position and a left steering position or in a vehicle such as a forklift which requires a rotary operation of three to four rotations, for example, a complicated operation is required. In addition, an operator is required to be skilled, which causes fatigue.

(2) The joystick lever type requires the operator to return the joystick lever to the central position whenever the actual steering angle becomes equal to the target steering angle, so as to return the steering valve from the steering position to the neutral position. In other words, the number of the operations is twice that of the handle type, which causes fatigue. In addition, the maximum tilt operation angle is a rotary angle of his wrist tilting leftward or rightward, and therefore, although there is an advantage in that the operator can control the vehicle with his wrist, the steering speed becomes higher as the tilt operation angle is increased. The joystick lever type has the following problems.

An abrupt increase of the tilt operation angle causes a shock which may shake the body at a start or a stop of joystick tilting. On the other hand, if the tilt operation angle is decreased, it takes a lot of time until the actual steering angle becomes equal to the target steering angle, wherein the operator cannot obtain an operational feeling obtained by the handle type. As set forth above, the tilt operation angle is irrelevant to the steering angle, and therefore it is not preferable to use the joystick lever type in a vehicle having wheels which cannot be seen directly.

In addition, while traveling at high-speed on a road, the steering angle must be controlled minutely and frequently as compared to control while traveling at low-speed. An operator can easily set a large tilt operation angle by mistake during an emergency, causing an abrupt change in steering. Therefore, it is not preferable to adopt this type of steering apparatus directly to a vehicle which travels at high speed.

Furthermore, in a wheel loader which requires quick and sharp switching between a right steering position and a left steering position, or in a forklift which requires a great steering angle, it is inevitable that a great tilt operation angle will be set. In this case, an abrupt change in steering is also caused, which leads to operator fatigue. If the maximum opening area of the steering valve is decreased as a countermeasure, the working efficiency of the vehicle is lower than that of the handle type.

SUMMARY OF THE INVENTION

In view of these problems of the related art, it is an object of the present invention to provide a hydraulic steering apparatus in which a small number of operations are required, despite the apparatus requiring a minor angle of operation, and in which a frequent control is achieved even for minute steering and its hydraulic valve.

In accordance with a first aspect of the present invention, a hydraulic steering apparatus is provided having a target steering angle input means for entering a target steering angle, a pilot valve having a neutral position and a left and right steering positions for receiving the target steering angle from the target steering angle input means and outputting pressurized oil received from a first oil pressure source when switched from the neutral position to one of the left or right steering positions. Further, a main steering valve having a neutral position and left and right steering positions for receiving an output oil pressure from the pilot valve and outputting pressurized oil from a second oil pressure source when switched from the neutral position to one of the left or right steering positions, and a hydraulic actuator which receives pressurized oil from the main steering valve are provided. The hydraulic steering apparatus is mounted onto an automatic traveling vehicle which obtains an actual steering angle by the operation of the hydraulic actuator, comprising a pilot valve having a first sleeve which receives the target steering angle from the target steering angle input means, a second sleeve which receives the actual steering angle of the automatic traveling vehicle, a first spring for applying a spring force to the first and second sleeves toward the neutral position based on a relative position of the first and second sleeves and the left and right steering positions. Further, a target steering angle detecting means, for detecting a target steering angle of the first sleeve, and an actual steering angle detecting means, for detecting an actual steering angle of the second sleeve are provided.

An excitation current output means receives the target steering angle from the target steering angle detecting means and the actual steering angle from the actual steering angle detecting means and calculates a deviation angle $\Delta\theta$ between them in order to output an excitation current corresponding to the deviation angle. An electromagnetic variable pressure reducing valve which switches pressurized oil from the pilot valve to the main steering valve upon receiving an excitation current from the excitation current output means wherein the actual steering angle is obtained with the target steering angle following.

According to a first embodiment, the pilot valve has first and second sleeves to which a spring force is applied toward a neutral position side by a first spring. In addition, the first sleeve receives the target steering angle $\theta_{in}$ from the target steering angle input means, while the second sleeve receives the actual steering angle $\theta_{fb}$ of the automatic traveling vehicle. During steering, the target steering angle is generated first, and then the actual steering angle follows. In the neutral position, however, the formula $\theta_{in}=\theta_{fb}$ is satisfied, wherein $\theta_{in}$ is the target steering angle and $\theta_{fb}$ is the actual steering angle, and the deviation angle ($\Delta\theta$) between them becomes zero.

During steering, since the target steering angle $\theta_{in}$ is generated first and then the actual steering angle $\theta_{fb}$ follows, a deviation angle $\Delta\theta$ ($=\theta_{in}-\theta_{fb}\neq 0$) arises. The maximum value of the deviation angle $\Delta\theta$ does not exceed a deflection angle of the first spring (for example, a minute angle of 10 to 20 deg). Whether the target steering angle input means is a handle type or a joystick lever type, it is possible to obtain the actual steering angle $\theta_{fb}$ corresponding to the rotary operation angle $\theta_{in}$ or a tilt operation angle $\theta_{in}$, if the rotary operation or the tilt operation is continued with the deviation angle $\Delta\theta$ kept constant during the steering operation. The steering operation is stopped by halting the rotary operation or the tilt operation (in other words, by fixing the rotary operation angle $\theta_{in}$ or the tilt operation angle $\theta_{in}$ to a certain value) and then the steering valve gradually returns toward the neutral position side by the spring force of the first spring. Therefore, even if the target steering angle input means is a joystick lever type or the vehicle has wheels which cannot be directly seen, an operator can steer the vehicle by bodily sensing the steering angle $\theta_{fb}$ by means of a wrist angle (in other words, the tilt operation angle $\theta_{in}$) of the joystick lever or by visual observation. In spite of a minor tilt operation angle, either a handle and a joystick lever can be applied to the apparatus, and furthermore a more preferable steering feeling is obtained as compared with the handle type manipulated with a major rotary angle operation. It is suitable for a wheel loader which requires a quick and sharp switch operation between a right steering position and a left steering position or for a forklift which requires a great steering angle.

In addition, the excitation current output means calculates the deviation angle $\Delta\theta$ and thus outputs an excitation current I corresponding to the deviation angle $\Delta\theta$ to an electromagnetic variable pressure reducing valve. The electromagnetic variable pressure reducing valve changes an output oil pressure of the pilot valve according to the excitation current I. By preparing various excitation currents I corresponding to the deviation angle $\Delta\theta$ (for example, a required current based upon the degree of the deviation angle $\Delta\theta$ or upon a rate of change f' ($\Delta\theta$) or the like of the deviation angle $\Delta\theta$) and decreasing the oil pressure at the start or stop of the steering operation, or decreasing the change in the oil pressure, it is possible to prevent a shock caused by the joystick lever type.

A second aspect of the present invention comprises a vehicle speed detecting means for detecting a vehicle V and an excitation current output means for calculating a deviation angle $\Delta\theta$ between a target steering angle $\theta_{in}$ received from the target steering angle detecting means and an actual steering angle $\theta_{fb}$ received from the actual steering angle detecting means. An excitation current I is generated corresponding to the deviation angle, and the maximum value of the excitation current I is outputted after receiving a vehicle speed V from the vehicle speed detecting means so as to decrease the maximum value of the excitation current I if the vehicle speed is high or to increase the maximum value of the excitation current I if the vehicle speed is low.

According to the above embodiment, the excitation current output means outputs the maximum value of the excitation current I after decreasing the maximum value of the excitation current I, if the automatic traveling vehicle runs at high speed, or after increasing the maximum value thereof, if it runs at low speed. Therefore, a steering operation at high vehicle speed can be finely controlled, by which an operator can steer the vehicle stably while running the vehicle at high speed, which contributes to safe operation.

A third aspect according to the present invention is characterized in that the electromagnetic variable pressure reducing valve is a minimum pressure compensated variable pressure reducing valve C2, which is compensated for the minimum pressure $P_{min}$.

According to the above configuration, even if a supply oil pressure to the pilot valve is variable with the excitation current I, the reference oil pressure is equal to the minimum pressure $P_{min}$. Therefore, it is possible to prevent a shock from occurring at the start of steering by means of the minimum pressure $P_{min}$. In addition, changes in the oil pressure caused by the excitation current I can be continuously made. This makes it possible to obtain smooth and quick responsive properties. Furthermore, the steering control at the minimum pressure $P_{min}$, which is the reference oil pressure, gives a required and sufficient controllability at that time, and therefore, in the case of an error in an electrical system, steering backed by the minimum pressure Pmin is assured. In other words, the minimum pressure Pmin has a foolproof function.

A fourth aspect according to the present invention is characterized in that the pilot valve comprises a first sleeve which receives the target steering angle $\theta_{in}$ from the target steering angle input means; a second sleeve which receives the actual steering angle $\theta_{fb}$ of the automatic traveling vehicle; a first spring for applying a spring force to the first and second sleeves toward the neutral position based on the relative positions of the first and second sleeves and the left and right steering positions; a target steering angle detecting means for detecting a target steering angle $\theta_{in}$ of the first sleeve; and an actual steering angle detecting means for detecting an actual steering angle $\theta_{fb}$ of the second sleeve. A second spring is provided for transmitting the actual steering angle $\theta_{fb}$ of the automatic traveling vehicle to the second sleeve, the second spring suspended between the automatic traveling vehicle and the second sleeve by means of an initial spring force $F_{LO}$ which is stronger than an initial spring force $F_{CO}$ of the first spring.

According to the above embodiment, even if a spring constant value of the first spring is relatively large in an emergency situation, an operator may attempt to operate the target steering angle input means with longer swings by means of a greater operating force Fin. At this point, the first spring is deflected to its utmost and an attempt is made to transmit directly the operating force Fin of the target steering angle input means to the automatic traveling vehicle.

The second spring is provided, however, for transmitting the actual steering angle $\theta_{fb}$ of the automatic traveling vehicle to the second sleeve by being suspended between the automatic traveling vehicle and the second sleeve by means of the initial spring force $F_{LO}$, which is stronger than the initial spring force $F_{CO}$ of the first spring. Therefore, the greater operating force Fin is absorbed by the second spring after the first spring is deflected to its utmost. Accordingly, the operator can sense bodily that he has generated a large operating force Fin. The first spring or the like can be prevented from being broken by an excess operating force Fin. In addition, by providing the second spring between the actual steering angle detecting means and the second sleeve, the operator can recognize the excess operating force Fin by using the excitation current output means so as to control an output value of the excitation current I.

A hydraulic valve according to the present invention comprises a first sleeve which receives a first rotary angle $\theta_{in}$; a second sleeve which receives a second rotary angle $\theta_{fb}$; a first spring for applying a spring force to the first and second sleeves toward the neutral position based on the relative positions of the first and second sleeves and the left and right steering positions; and a second spring for transmitting a second rotary angle $\theta_{fb}$ to the second sleeve, the second spring having an initial spring force $F_{LO}$, which is stronger than an initial spring force $F_{CO}$ of the first spring.

The hydraulic valve as set forth in the above corresponds to a main portion of the pilot valve in the fourth aspect of the invention, and it has a very simple configuration in spite of the action and effect in the above. This hydraulic valve is not limited to an automatic traveling vehicle, but it can be adopted to various types of hydraulic rotary mechanisms so as to be used as a positioning member of its predetermined rotary angle.

DETAILED DESCRIPTION OF THE PREFERRED EMBODIMENTS

A hydraulic steering apparatus and its hydraulic valve according to embodiments of the present invention will be described below by reference to FIGS. 1 to 6.

Figure 1:
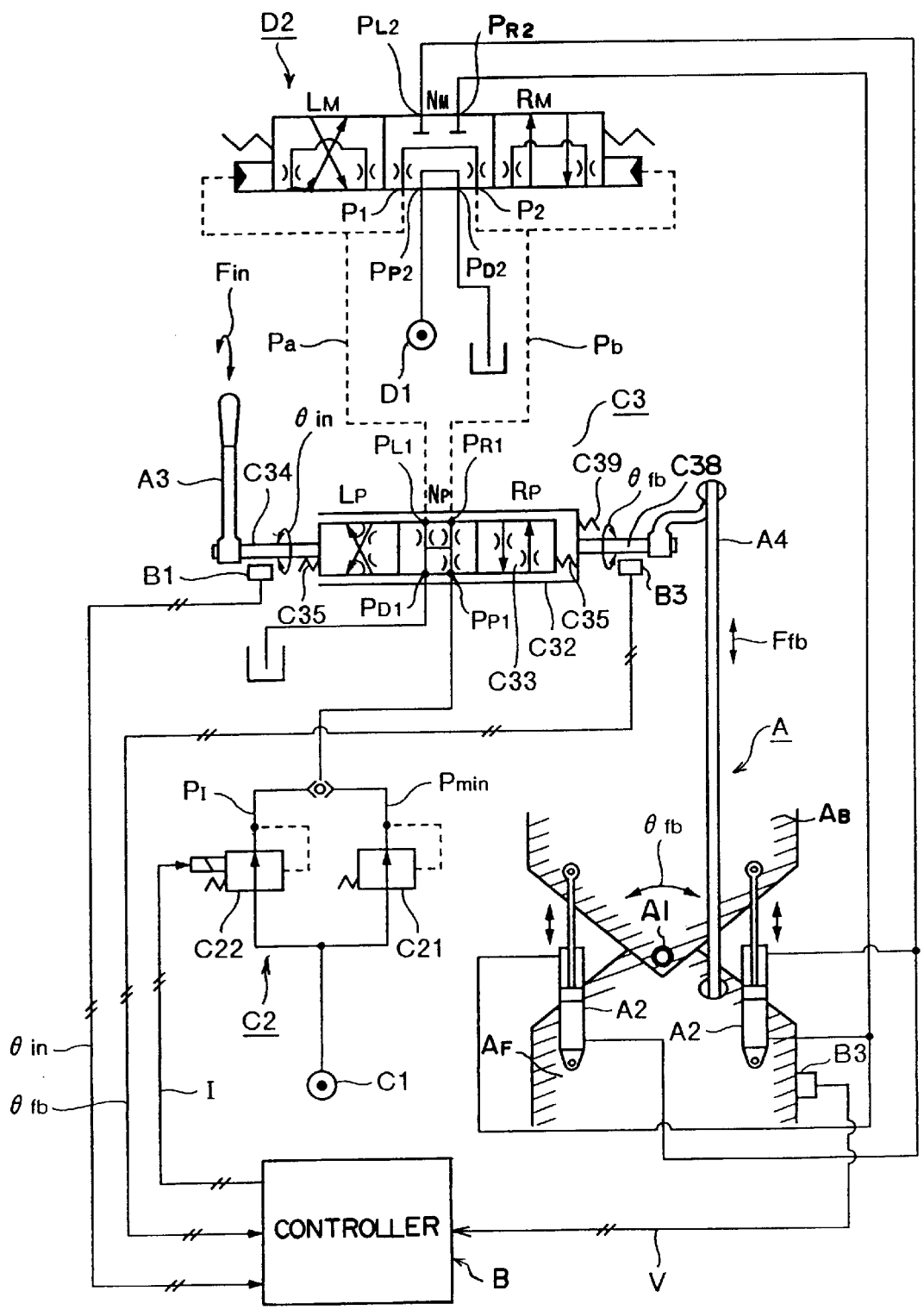
FIG. 1 is a diagram showing a hydraulic circuit of a hydraulic steering apparatus according to an embodiment of the present invention.

A vehicle having a hydraulic steering apparatus of the present invention is a wheel loader, which has a bucket in its front portion which moves up and down freely, can travel automatically, and is used to load gravel, earth and sand, minerals, or the like, scooped up by the bucket into a dump truck in a construction site or a mine. As shown in FIG. 1, a body A is divided to two parts, front and back bodies $A_F$ and $A_B$, which form an articulate wheel loader connected with a pin A1. The back body $A_B$ has a cab seat (not shown)

and steering hydraulic cylinders A2, A2 are provided between the front and back bodies $A_F$ and $A_B$. The cab seat has a joystick lever A3 for steering the loader. The joystick lever A3 can be tilted freely rightward or leftward from the central position and the maximum tilt operation angle is equal to a rotary angle of the wrist tilting rightward or leftward. Between the side of the joystick lever A3 and the front body $A_F$ there is provided a link A4 which allows an articulate angle $\theta_{fb}$ (in other words, a steering angle $\theta_{fb}$) between the front and back bodies $A_F$ and $A_B$ to be fed back to the joystick lever A3. The body A comprises a steering hydraulic circuit for steering, first and second rotary angle detectors B1 and B2, a vehicle speed detector B3, a controller B comprising a microcomputer, and the like.

The steering hydraulic circuit comprises a pilot hydraulic circuit having a pilot oil pressure source C1, a minimum-pressure compensated variable pressure reducing valve C2, a rotary pilot valve C3, and a main hydraulic circuit having a main oil pressure source D1, a main steering valve D2, and steering hydraulic cylinders A2, A2.

The pilot oil pressure source C1 comprises a pilot hydraulic pump or a relief valve, for example, which makes it possible to supply pressurized oil, having a pressure higher than the maximum output oil pressure of the minimum-pressure compensated variable pressure reducing valve C2, to the minimum-pressure compensated variable pressure reducing valve C2.

The minimum-pressure compensated variable pressure reducing valve C2 controllably reduces a pressure while compensating the pressurized oil from the pilot oil pressure source C1 for the minimum pressure and supplies the controlled oil pressure to the rotary pilot valve C3. In this embodiment, a first pressure reducing valve C21, for compensating for the minimum pressure $P_{min}$, is connected in parallel to a second variable pressure reducing valve C22, for controllably reducing an oil pressure PI higher than the minimum pressure $P_{min}$ (PI>$P_{min}$, the oil pressure PI naturally being lower than the oil pressure of the pilot oil pressure source C1) to supply it to the rotary pilot valve C3, between the pilot oil pressure source C1 and the rotary pilot valve C3. At this point, the second variable pressure reducing valve C22 is an electromagnetic pressure reducing valve in which a spring force of the spring for reducing a pressure setting is changeable by an electromagnetic force. An excitation current I to the second variable pressure reducing valve C22 is received from the controller B.

The rotary pilot valve C3 is a 4-port, 3-position directional changeover valve having a pump port PP1, a drain port PD1, and left and right output ports PL1 and PR1, in a neutral position Np, a left steering position Lp, and right steering position Rp, respectively. The neutral position Np is of a float type having the four ports communicated to each other.

Figure 2:
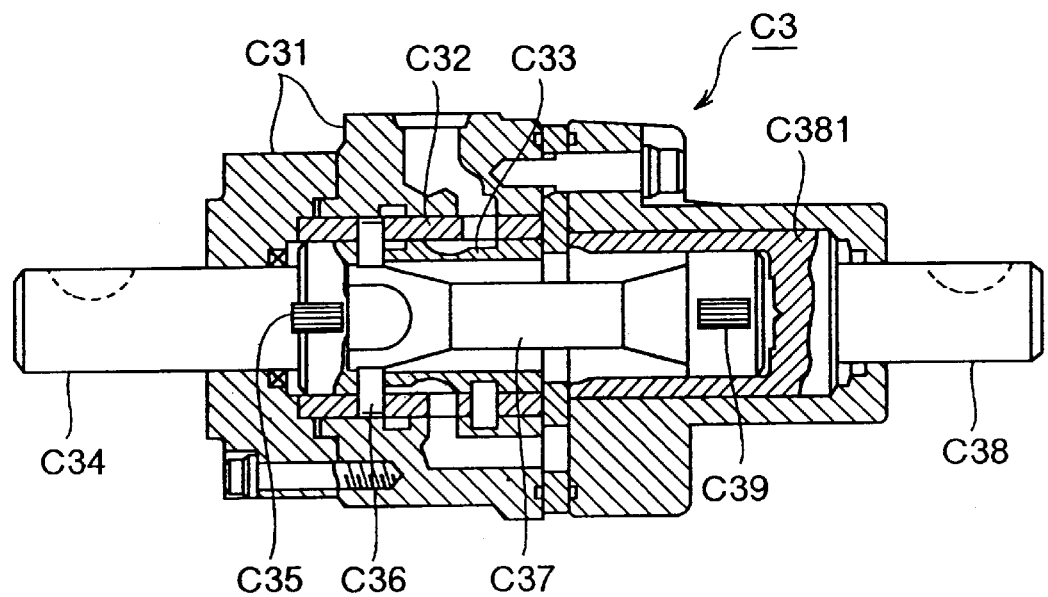
FIG. 2 is an enlarged sectional view of a rotary pilot valve shown in FIG. 1.

The rotary pilot valve C3 has a valve body C31 to which a second sleeve C32 (hereinafter, referred to as an outer sleeve C32 in this embodiment) is fitted within, as shown in FIG. 2. The outer sleeve C32 includes a first sleeve C33 (hereinafter, referred to as an inner sleeve C33 in this embodiment) fitted thereto within. On the left side of the inner sleeve C33, there is provided an input shaft C34. The input shaft C34 is directly connected at its left end to the joystick lever A3 without a reduction mechanism. Accordingly when an operator tilts the joystick lever A3 rightward by a tilt operation angle $\theta_{in}$, the inner sleeve C33 rotates clockwise by the same tilt operation angle $\theta_{in}$. The inner sleeve C33 has square holes (not shown since they are perpendicular to the document surface) diametrically parallel at its left end, while the outer sleeve C32 has square grooves (not shown since they are perpendicular to the document surface) on an opposite wall diametrically parallel at its left end. Both of the sleeves C32 and C33 are connected to each other by means of a first spring C35 penetrating through the square holes and the square grooves.

Figure 3A:
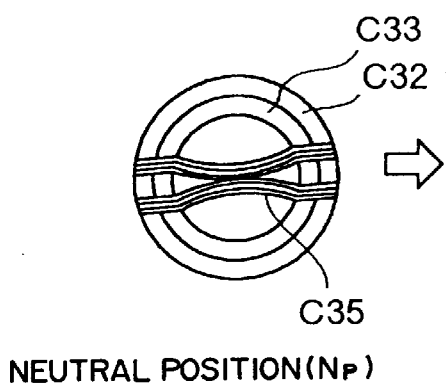
FIG. 3A is a diagram illustrating first and second springs in a neutral position of the rotary pilot valve.

As shown in FIG. 3A, the first spring C35 is formed by raised leaf springs having a plurality of and the same number of springs being superposed so as to be X-shaped, penetrating through the square holes of the inner sleeve C33 with both ends inserted into both of the square grooves of the outer sleeve C32, respectively. The sleeves C32 and C33 are connected to each other by means of the first spring C35.

Additionally, on the opposite walls diametrically parallel to the sleeves C32 and C33, there are provided four round holes through which a single pin C36 penetrates. The inner diameter of the two round holes provided on the opposite wall of the outer sleeve C32 is approximately equal to the outer diameter of the pin C36, while the inner diameter of the two round holes on the opposite wall of the inner sleeve C33 is greater than the outer diameter of the pin C36. A central portion of the pin C36 is inserted into the groove provided on the left end surface of a second feedback shaft C37, and the outer sleeve C32 is integrally connected to the second feedback shaft C37 by the pin C36.

Figure 4:
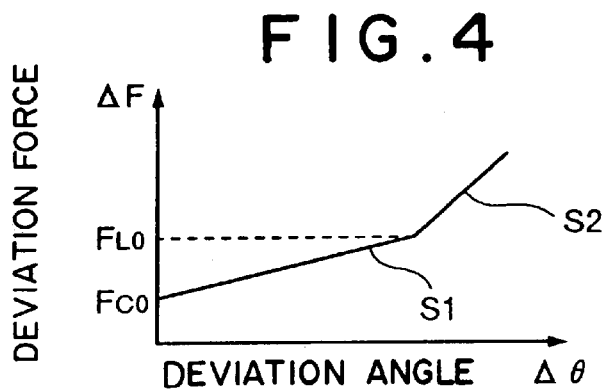
FIG. 4 is a diagram showing spring force characteristics of the first and second springs.

The right end of the second feedback shaft C37 is inserted into a sleeve C381 formed at the left end of the first feedback shaft C38. Furthermore, a second spring C39 is inserted into square holes (not shown since they are perpendicular to the document surface) and into square grooves (not shown since they are perpendicular to the document surface) provided on the opposite wall, diametrically parallel, provided at the right end of the second feedback shaft C37, in the same manner as for the first spring C35. In other words, the outer sleeve C32 and the first feedback shaft C38 are connected to each other via the pin C36, the second feedback shaft C37, and the second spring C39. The initial spring force $F_{LO}$ of the second spring C39 is set to a value greater than the initial spring force $F_{CO}$ of the first spring C35, as shown in FIG. 4.

The right end of the first feedback shaft C38 is directly connected to the link A4 without any reduction mechanism. If the body A is steered rightward by a steering angle $\theta_{fb}$ (where a deviation angle $\Delta F = F_{in} - F_{fb}$, between the steering force $F_{fb}$ and a tilt operating force $F_{in}$ to the joystick lever A3, is lower than the initial spring force $F_{LO}$ of the second spring C39), the outer sleeve C32 rotates clockwise by the same angle $\theta_{fb}$ as the steering angle $\theta_{fb}$.

The main oil pressure source D1 comprises a main hydraulic pump, a relief valve, and other parts, and supplies operating oil to the main steering valve D2 as shown in FIG. 1.

The main steering valve D2 is a 6-port, 3-position directional control valve having a pump port PP2, a drain port PD2, left and right output ports PL2 and PR2, and pilot hydraulic communication ports P1 and P2 in a neutral position NM, a left steering position LM, and a right steering position RM, respectively. The pilot hydraulic communication ports P1 and P2 are in communication with each other in the positions NM, LM, and RM with a variable constriction for changing an opening area during operation of the main steering valve D2 as shown. The left end of the main steering valve D2 is connected to a left output port PL1 of the rotary pilot valve C3, and the right end thereof is connected to a right output port PR1 of the rotary pilot valve C3, so that the main steering valve can be switched when receiving a pilot oil pressure Pa or Pb from the left or right output port PL1 or PR1 of the rotary pilot valve C3. An opening area of the main steering valve D2 changes according to the movement of a spool so as to increase or decrease a flow rate Q to the steering hydraulic cylinders A2, A2. Additionally, opening areas of the variable constrictions in the positions, NM, LM, and RM vary according to the movement of the spool.

The steering hydraulic cylinders A2, A2 stretch when receiving pressurized oil from the left and right output ports PL2 and PR2, of the main steering valve D2, so as to articulate (in other words, steer) the body A.

The first rotary angle detector B1, the second rotary angle detector B2, and the vehicle speed detector B3 are provided so that a rotary angle $\theta_{in}$ of the input shaft C34, a rotary angle $\theta_{fb}$ of the first feedback shaft C38, and a vehicle speed V of an example vehicle are detectable, respectively, and their detected information $\theta_{in}$, $\theta_{fb}$, and V are entered into the controller B.

The controller B receives the detected information $\theta_{in}$, $\theta_{fb}$, and V from the detectors B1 to B3 and calculates a deviation angle $\Delta\theta$ ($\theta_{in}-\theta_{fb}$) and its change rate f' ($\Delta\theta$). The controller B previously stores an excitation current I per deviation angle $\Delta\theta$ with the vehicle speed V as a parameter, which is used for the main steering valve D2 to supply a flow rate Q per deviation angle $\Delta\theta$ with the vehicle speed V as a parameter, as shown in FIG. 5, to the steering hydraulic cylinders A2, A2 on the basis of calibration data which has been previously executed by means of functions or matrices.

Figure 5:
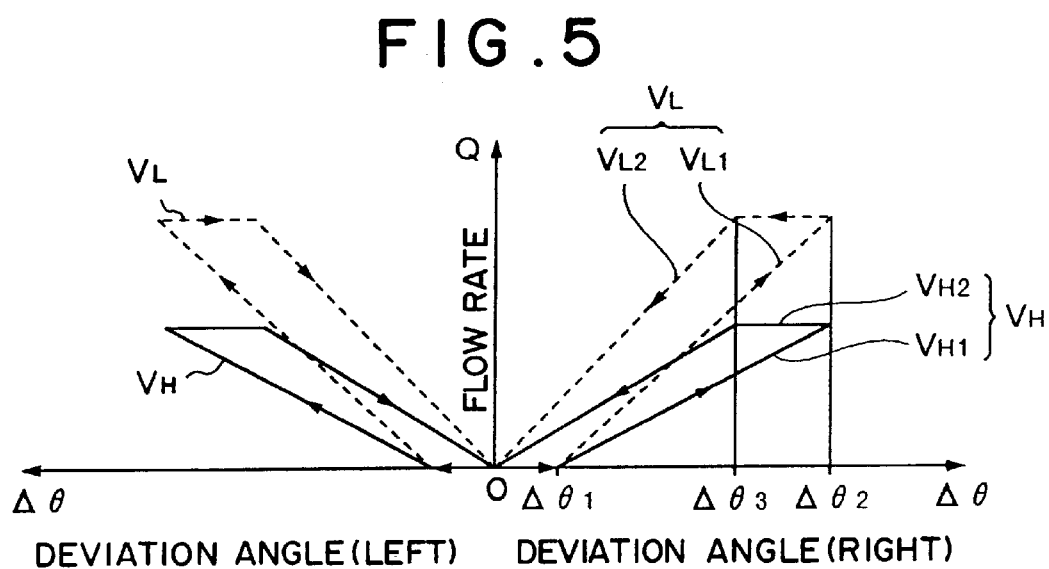
FIG. 5 is a diagram showing the flow rate characteristics of a hydraulic cylinder for steering each deviation angle with a vehicle speed as a parameter.

FIG. 5 shows characteristics of a flow rate for left steering on the left side and characteristics of a flow rate for right steering on the right side. The characteristics of the flow rate for the left steering are the same as for right steering, and therefore the characteristics of the flow rate for right steering will be described below.

In this embodiment, a relation between a flow rate Q (ordinate axis) to the steering hydraulic cylinders A2, A2 and the deviation angle $\Delta\theta$ (abscissa axis) is mainly classified into two steps: characteristics VL at low vehicle speed and characteristics VH at high vehicle speed. In both cases, a change of the flow rate Q is relatively low when a change rate f'($\Delta\theta$) of the deviation angle $\Delta\theta$ is positive (f'($\Delta\theta$)>0), wherein the deviation angle $\Delta\theta$ will increase to indicate the start of steering and the deviation angle $\Delta\theta$ is low (0 to $\Delta\theta1$) and when the subsequent f'($\Delta\theta$) passes through zero (f'($\Delta\theta$)=0) and changes to be negative (f'($\Delta\theta$)<0) wherein the deviation angle $\Delta\theta$ will decrease to indicate the end of steering in a predetermined range ($\Delta\theta$ 2 to $\Delta\theta$ 3). In other words, hysteresis occurs in the gain of the flow rate Q at the beginning and at the end of steering. The maximum value of the flow rate Q of the characteristics VL at low vehicle speed is greater than that of the characteristics VH at high vehicle speed. The controller B is configured to store the excitation current I per deviation angle $\Delta\theta$, with the vehicle speed V as a parameter, which makes it possible to obtain the flow rate characteristics having hysteresis as set forth above and to be able to output the excitation current I.

Next, an action of this embodiment will be described below. To simplify the description, an exemplary tilt operation angle of the joystick lever A3 is assumed to be zero.

(1) When the joystick lever A3 is placed in the central position, both the tilt operation angle $\theta_{in}$ and the steering angle $\theta_{fb}$ are set to zero ($\theta_{in}=\theta_{fb}=0$) In other words, since an external force is not applied to the first spring C35, a positional relation between the sleeves C32, C33 and the first spring C35 is as shown in FIG. 3A and the rotary pilot valve C3 is placed in the neutral position Np. In detail, the first spring C35 connects the sleeve C32 to the sleeve C33, as shown in FIG. 3A, and the passageways of the sleeves C32 and C33 are in communication with each other to maintain the neutral position Np in a float status. The pilot oil pressures Pa and Pb from the left and right output ports PL1 and PR1 of the rotary pilot valve are equal (Pa=Pb), and therefore the main steering valve D2 also keeps the neutral position NM. At this point, it should be noted that a portion of the lines from the left and right output ports PL1 and PR1 to the pilot hydraulic communication ports P1 and P2 of the main steering valve D2 is filled with pilot oil at the minimum pressure $P_{min}$, compensated for by the first pressure reducing valve C21.

(2) Next, an operating force Fin for rightward tilting is applied to the joystick lever A3. At this time, the main steering valve D2 still remains in the neutral position NM. Therefore, the link A4 does not move (in other words, the steering angle $\theta_{fb}=0$), since the outer sleeve C32 is fixed. Subsequently, when the operating force Fin exceeds the initial spring force $F_{CO}$ of the first spring C35, the joystick lever A3 tilts by the operating angle $\theta_{in}$ from the central position, and the inner sleeve C33 rotates by the rotary angle $\theta_{in}$ together with it. In other words, the first spring C35 deflects according to the spring characteristics S1, shown in FIG. 4, and the pilot valve begins to shift from the neutral position Np in FIG. 3A to the right steering position Rp in FIG. 3B, thus a deviation angle $\Delta\theta$ (=$\theta_{in}$, $\theta_{fb}=0$) occurs. At this point, if the joystick lever A3 is tilted still further with a greater operating force Fin, the deviation angle $\Delta\theta$ increases gradually as shown in FIG. 4, and the rotary pilot valve C3 further shifts from the neutral position Np toward the right steering position Rp, in response to the gradual increase. In other words, the opening is extended with the pump port PP1 in communication with the right output port PR1, while the opening is extended with the drain port PP1 in communication with the left output port PL1. At this point, the controller B applies an excitation current I, with the vehicle speed V as a parameter, to the second variable pressure reducing valve C22 on the basis of the deviation angle $\Delta\theta$ which is a calculated value. The excitation current I is controlled by the controller B so as to achieve the beginning characteristics VL1 (indicated by dotted lines) at low vehicle speed, shown in FIG. 5, if the vehicle speed V detected by the vehicle speed detector B3 is low, and to achieve the beginning characteristics VH1 (indicated by solid lines) at high vehicle speed if the vehicle speed V is high. The ordinate axis $\Delta F$, in FIG. 4, corresponds to a deviation force between the operating force Fin and the reaction force $F_{fb}$ from the link A4. In other words, if a steering angle $\theta_{fb}$ occurs, the reaction force $F_{fb}$ is applied to the operating force $F_{in}$ so as to reduce the operating force $F_{in}$ by the corresponding amount.

(3) If an operator subsequently stops tilting the joystick lever A3 (in other words, the tilt operation angle $\theta_{in}$=fixed), the steering angle $\theta_{fb}$ increases gradually due to the flow rate Q until the steering angle $\theta_{fb}$ becomes equal to the tilt operation angle $\theta_{in}$ and the change rate (f'($\Delta\theta$>0) of the positive deviation angle $\Delta\theta$ changes to be negative (f'($\Delta\theta$)<0), passing through zero (f'($\Delta\theta$)=0). Immediately after that, a change of the flow rate Q within a predetermined range ($\Delta\theta_2$ to $\Delta\theta_3$) is moderate and a change of the flow rate Q in the subsequent range ($\Delta\theta$ 3 to 0) is sharp. At this time, the controller B also applies the excitation current I, with the vehicle speed V as a parameter, to the second variable pressure reducing valve C22 on the basis of the deviation angle $\Delta\theta$, which is a calculated value. The excitation current I is controlled by the controller B so as to achieve the ending characteristics VL2, in FIG. 5, if the vehicle speed V detected by the vehicle speed detector B3 is low, and to achieve the ending characteristics VH2 if the vehicle speed V is high.

According to this embodiment, the present invention has the following effects.

(a) When the rotary pilot valve C3 is placed in the neutral position Np, a portion of the lines from the left and right output ports PL1 and PR1 to the pilot hydraulic communication ports P1 and P2 of the main steering valve D2 is filled with pilot oil at the minimum pressure $P_{min}$, compensated for by the first pressure reducing valve C21. Therefore, the response characteristic is improved during the time from the start of the tilt operation until actual steering. Particularly, a response characteristic is improved at the starting of a vehicle at a low temperature or in the coldest area, in which a viscosity of an oil is high. Therefore, an oil having a low viscosity index (VI) can be used. In addition, a change in the oil pressure, caused by the excitation current I, can be continuously made from the minimum pressure $P_{min}$, by which a smooth and quick response characteristic can be obtained. In other words, a sharp change in pilot pressure can be restrained, and therefore the occurrence of a shock is limited at the start and stop of steering.

(b) change in the flow rate Q is moderated when a deviation angle $\Delta\theta$, at the beginning of the operation, in the start side is small, or when a deviation angle $\Delta\theta$ at the beginning of the operation in the stop side is great, by which a shock can be prevented at the start and stop of steering.

Figure 3B:
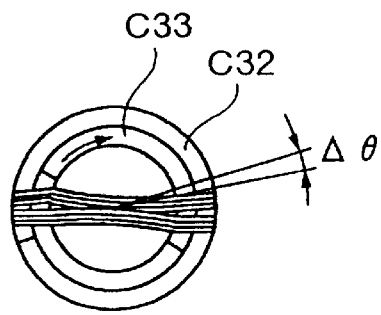
FIG. 3B is a diagram illustrating the first and second springs of FIG. 3A in left and right steering positions.

(c) The tilt operation angle $\theta_{in}$ can be misunderstood as the same tilt operation angle as for the conventional joystick lever type, such that the lever can be tilted up to the maximum tilt operation angle at a time. It, however, is not such a tilt operation angle. The tilt operation angle $\theta_{in}$ of the present invention corresponds to an added value obtained by adding the deviation angle $\Delta\theta$ to a steering angle $\theta_{fb}$ ($\theta_{in}=\Delta\theta+\theta_{fb}$), and the maximum value of the deviation angle $\Delta\theta$ is equal to the maximum relative rotary angle of the sleeves C32 and C33 obtained at the maximum amount of deflection of the first spring C35, as shown in FIG. 3B. In other words, the tilt operation angle $\theta_{in}$ corresponds to the steering angle $\theta_{fb}$. For example, if the joystick lever A3 is tilted continuously up to 30 deg, the steering angle $\theta_{fb}$ follows and finally stops at 30 deg. If the joystick lever A3 is tilted continuously up to 20 deg, the steering angle $\theta_{fb}$ follows and it stops at 20 deg, for example. Additionally, the operator can steer the apparatus while bodily sensing the steering angle $\theta_{fb}$ by means of a visual observation or on the basis of a wrist angle (in other words, a tilt operation angle $\theta_{in}$) of the joystick lever A3, by which he can obtain a more preferable steering feeling than that of the handle type apparatus, which is of a major rotary angle operation type, though the apparatus of the present invention is of a minor tilt operation angle type. Specifically, it is preferable for a wheel loader which requires a quick and sharp switch operation between a left steering position and a right steering position or in a forklift which requires a great steering angle.

(d) If the joystick lever A3 is stopped at a certain tilt operation angle $\theta_{in}$, and then a deviation angle $\Delta\theta$ becomes zero due to the link A4 ($\Delta\theta=0$, $\theta_{in}=\theta_{fb}$), the rotary pilot valve C3 and the main steering valve D2 also return to the neutral positions Np and NM. Therefore, this apparatus does not require such double operations in which the joystick lever is returned to the central position at each steering operation, as needed for the conventional joystick lever type. Specifically, it can be applied to a wheel loader which requires a quick switch operation between the left steering position and the right steering position.

(e) Not only in a normal operation, but in case of emergency, it is required to increase the steering speed (in other words, the deviation angle $\Delta\theta$ is required to be set to zero at a high speed ($\theta_{fb}=0$)). In case of emergency, the operator may attempt to tilt the joystick lever A3 sharply by means of a greater operating force Fin, even if a spring constant of the first spring C35 is relatively great. At this point, as shown in FIG. 5, the deviation angle $\Delta\theta$ keeps a high flow rate Q in the regions of "$\Delta\theta 1$ to $\Delta\theta 2$" and of "$\Delta\theta 3$ to 0." Accordingly, a high steering speed is obtained, so as to cope with the emergency.

(f) In case of emergency, the operator may attempt to tilt the joystick lever A3 more sharply by means of a greater operating force Fin even if the spring constant of the first spring C35 is relatively great. At this point, the first spring is deflected to the utmost and an attempt is made to transmit directly the tilt operating force Fin of the joystick lever A3 to the link A4. In this embodiment, however, as shown in FIG. 4, there is provided second spring C39, having an initial spring force $F_{LO}$, which is greater than an initial spring force $F_{CO}$ of the first spring C35, between the first and second feedback shafts C38 and C37. Accordingly, the operator can bodily sense that he has generated an excess operating force $F_{in}$, since a great operating force Fin is absorbed by the second spring C39 after the first spring C35 is deflected to the utmost, by which the operating force Fin can be automatically restrained, thus preventing the first spring C35 or other parts from being damaged. The spring characteristic of the second spring C39 is indicated by a characteristic S2 in FIG. 4.

While the controller B in this embodiment generates an excitation current I based on a deviation angle $\Delta\theta$ in the first spring C35 and enters it into the second variable pressure reducing valve C22, the stability of a vehicle may be secured by increasing the flow rate Q at a fixed rate when the second spring C39 is deflected, for example, by taking into consideration the deflection of the second spring C39.

(g) During high-speed operations, the controller B detects a vehicle speed V by means of a vehicle speed detector B3 and adopts characteristics VH at high vehicle speed as shown in FIG. 5. The maximum value of the flow rate Q, with the characteristics VH at high vehicle speed, is smaller than the maximum value of the flow rate Q with the characteristics VL, at low vehicle speed, thus stabilizing the steering operation at high vehicle speed so as to contribute to safe operation.

(h) The rotary pilot valve C3 is a basic part of this embodiment. This rotary pilot valve C3 has a very simple configuration, as shown in FIG. 2, by which it can be easily manufactured. In addition, it can be used for various types of hydraulic rotary mechanisms other than a vehicle as a positioning member for its predetermined rotary angle.

Next, applied examples of this embodiment will be outlined below.

Figure 6:
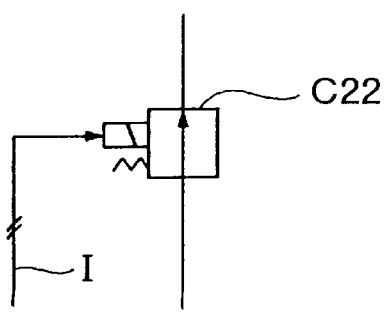
FIG. 6 is a diagram showing a hydraulic circuit of another embodiment according to a minimum-pressure compensated variable pressure reducing valve of the present invention.

(1) While the minimum pressure compensated variable pressure reducing valve C2 comprises a first pressure reducing valve C21, with the minimum pressure $P_{min}$ compensated for, and a second variable pressure reducing valve C22 in this embodiment, it may be formed only by the second variable pressure reducing valve C22, as shown in FIG. 6. In this example, the second variable pressure reducing valve C22 has an initial spring force for compensating for an output of the minimum pressure $P_{min}$ when the excitation current I is set to zero (I=0).

(2) While the minimum pressure compensated variable pressure reducing valve C2 is provided between the first oil pressure source C1 and the rotary pilot valve C3 in this embodiment, it may be placed between the rotary pilot valve C3 and the main steering valve D2. It is required only that the output oil pressures Pa and Pb, of the rotary pilot valve C3, (in other words the input pilot oil pressures to the main steering valve D2) are variable.

(3) The controller B of this embodiment stores an excitation current I per deviation angle Δθ, with the vehicle speed V as a parameter, which is used for the main steering valve D2 to supply a flow rate Q per deviation angle Δθ, with the vehicle speed V as a parameter, as shown in FIG. 5, to the steering hydraulic cylinder A2 on the basis of calibration data which has been previously executed by means of functions or matrices.

In this relationship, the gain control of the excitation current I for the vehicle speed V as a parameter is not changed as set forth in this embodiment. The excitation current I per deviation angle Δθ is, however, changed to an excitation current I proportional to the deviation angle Δθ. In this condition, only by optimally selecting the cutout shape of an opening in each of the positions Np, Lp, and Rp of the rotary pilot valve C3, the cutout shape of an opening in an internal flow path of each of the positions NM, LM, and RM of the main steering valve D2, and the shape of a variable constriction between the pilot hydraulic communication ports P1 and P2 of the main steering valve D2, the main steering valve D2 can supply the flow rate Q per deviation angle Δθ to the steering hydraulic cylinder A2. Accordingly, it is not necessary to previously store the functions nor matrices of the controller B.

(4) While the rotary pilot valve C3 in this embodiment has a neutral position Np of a float type in which four ports are communicated in communication with each other, the value C3 may be of an open center type or of a closed center type. In this case, the pump port PP1 is disconnected from the left and right output ports PL1 and PR1 in the neutral position Np, and, therefore, a shock is caused by a change in oil pressure at the beginning of the start of steering. The change in the oil pressure, however, results from the minimum pressure $P_{min}$ and the shock is insignificant.

(5) While the first and second rotary angle detectors B1 and B2 are provided for the controller B to calculate the deviation angle Δθ in this embodiment, they may be torque detectors. In this case, the torque detectors may be devices to detect a torque of the input shaft C34 or of the first feedback shaft C38, and a single device may be used as the torque detector. In other words, a detected value itself of the torque detector is a deviation torque ΔT, corresponding to the deviation angle Δθ. A change rate f'(Δθ) of the deviation angle Δθ may be calculated as a change rate f'(ΔT) of the deviation torque ΔT. Therefore, a target steering angle detecting means B1 for detecting the target steering angle $\theta_{in}$ of the first sleeve C33, and an actual steering angle detecting means B2 for detecting the actual steering angle $\theta_{fb}$ of the second sleeve C32 covers a single torque detector.

(6) While the rotary pilot valve C3 in this embodiment has a pin C36 and a second feedback shaft C37, based on the configuration in FIG. 2, they may be omitted, but the outer sleeve C32 (the second sleeve C32) may be added onto the first feedback shaft C38 via the second spring C39 instead. It has the same effect as for the rotary pilot valve C3 in this embodiment.

(7) While the rotary pilot valve C3 is used in this embodiment, it is possible to use a stroke pilot valve in which a tilt operation angle $\theta_{in}$ of the joystick lever A3 and a steering angle $\theta_{fb}$ are converted to a linear motion through a link mechanism before this linear motion is entered.

(8) While the rotary pilot valve C3 in this embodiment is described such that it has a first sleeve C33, as an inner sleeve C33, and a second sleeve C32, as an outer sleeve C32, based on a configuration in FIG. 2, the first sleeve C33 may be an outer sleeve and the second sleeve C32 be an inner sleeve with their replacement in the configuration. In this configuration, the same effect is obtained as for the rotary pilot valve C3 in this embodiment.

(9) While the joystick lever A3 is used in this embodiment, it may be replaced with a handle. In other words, any part may be used if it can provide an operation angle for steering into the pilot valve C3.

(10) While the vehicle on which the hydraulic steering apparatus is mounted in this embodiment is an articulate wheel loader, it may be a wheel loader which is steered by a tie rod or a knuckle arm, for example, if only it is an automatic traveling vehicle which can be steered.

(11) The hydraulic steering apparatus of this embodiment is mounted not only to an automatic traveling vehicle, but to, for example, a machine tool which is located at a predetermined rotary angle in various types of hydraulic rotary mechanisms.

Although the present invention has been described with reference to presently preferred embodiments, it will be appreciated by those skilled in the art that various modifications, alternatives, variations, etc., may be made without departing from the spirit and scope of the invention as defined in the appended claims.

What is claimed is:

1. A hydraulic steering apparatus for an automatic traveling vehicle comprising:

means for inputting a target steering angle;

a pilot valve, having a neutral position and left and right steering positions, for outputting pressurized oil, from a first oil pressure source, after being switched from said neutral position to one of said left and right steering positions;

a main steering valve having a neutral position and left and right steering positions for receiving pressurized oil from said pilot valve and for outputting pressurized oil, from a second oil pressure source, after being switched from said neutral position to one of said left and right steering positions;

a plurality of hydraulic actuators for receiving pressurized oil from said main steering valve to produce an actual steering angle in said automatic traveling vehicle;

means for outputting an excitation current, based upon a deviation between said target steering angle and said actual steering angle; and an electromagnetic variable pressure reducing valve for switching pressurized oil from said pilot valve to said main steering valve based upon said excitation current, wherein said pilot valve comprises:
a first sleeve for receiving said target steering angle;
a second sleeve for receiving said actual steering angle;
a first spring for applying a spring force to urge said first sleeve and said second sleeve toward said neutral position based on a relative position of said first sleeve and said second sleeve to said left and right steering positions;

means for detecting said target steering angle from said first sleeve;

means for detecting said actual steering angle from said second sleeve; and wherein said actual steering angle is produced by following said target steering angle.

2. A hydraulic steering apparatus, as claimed in claim 1, further comprising means for detecting a speed of said automatic traveling vehicle, wherein said means for outputting said excitation current decreases a maximum value of said excitation current if said vehicle speed is high or increases said maximum value of said excitation current if said vehicle speed is low, based upon a result of said means for detecting a speed of said automatic traveling vehicle.

3. A hydraulic steering apparatus, as claimed in claim 1, wherein said electromagnetic variable pressure reducing valve is compensated for a minimum pressure.

4. A hydraulic steering apparatus, as claimed in claim 1, wherein said pilot valve further comprises a second spring for transmitting said actual steering angle of said automatic traveling vehicle to said second sleeve, wherein said spring is suspended between said automatic traveling vehicle and said second sleeve and wherein an initial spring force of said second spring is greater than an initial spring force of said first spring.

5. A method of steering an automatic traveling vehicle, comprising the steps of:

inputting a target steering angle;

switching a pilot valve from a neutral position to one of left and right steering positions;

outputting pressurized oil from said pilot valve to a main steering valve after said step of switching of said pilot valve;

switching said main steering valve from a neutral position to one of left and right steering positions;

outputting pressurized oil from said main steering valve to a plurality of hydraulic actuators after said step of switching of said main steering valve;

producing an actual steering angle in said automatic traveling vehicle by operating said hydraulic actuators;

outputting an excitation current based upon a deviation between said target steering angle and said actual steering angle; and switching pressurized oil from said pilot valve to said main steering valve based upon said excitation current.

6. A method of steering an automatic traveling vehicle, as claimed in claim 5, further comprising the steps of:

receiving said target steering angle by a first sleeve;

receiving said actual steering angle by a second sleeve;

applying a spring force to urge said first sleeve and said second sleeve to said neutral position of said pilot valve based upon a relative position of said first sleeve and said second sleeve to said left and right steering positions of said pilot valve;

detecting said target steering angle from said first sleeve; and detecting said actual steering angle from said second sleeve, wherein said step of producing an actual steering angle is accomplished by following said target steering angle.

7. A method of steering an automatic traveling vehicle, as claimed in claim 5, further comprising the steps of:

detecting a speed of said automatic traveling vehicle;

decreasing a maximum value of said excitation current if said vehicle speed is high; and increasing said maximum value of said excitation current if said vehicle speed is low.

8. A method of steering an automatic traveling vehicle, as claimed in claim 5, further comprising the step of:

compensating said pressurized oil, switched in said step of switching pressurized oil from said pilot valve to said main steering valve based upon said excitation current, for a minimum pressure.

9. A method of steering an automatic traveling vehicle, as claimed in claim 5, further comprising the step of:

transmitting said actual steering angle to said second sleeve.

* * * * *